United States Patent
Yoshida (10) Patent No.: US 12,305,100 B2
(45) Date of Patent: May 20, 2025

(54) METHOD FOR PRODUCING FLUORIDE PHOSPHOR

(71) Applicant: NICHIA CORPORATION, Anan (JP)

(72) Inventor: Masato Yoshida, Tokushima (JP)

(73) Assignee: NICHIA CORPORATION, Anan (JP)

( * ) Notice: Subject to any disclaimer, the term of this patent is extended or adjusted under 35 U.S.C. 154(b) by 170 days.

(21) Appl. No.: 17/809,709

(22) Filed: Jun. 29, 2022

(65) Prior Publication Data

US 2023/0018663 A1 Jan. 19, 2023

(30) Foreign Application Priority Data

Jul. 2, 2021 (JP) .................................. 2021-110955

(51) Int. Cl.
| | |
|---|---|
| *C09K 11/64* | (2006.01) |
| *C01B 33/10* | (2006.01) |
| *C09K 11/61* | (2006.01) |
| *C09K 11/77* | (2006.01) |

(52) U.S. Cl.
CPC .......... *C09K 11/646* (2013.01); *C01B 33/103* (2013.01); *C09K 11/617* (2013.01); *C09K 11/77348* (2021.01)

(58) Field of Classification Search
CPC .... C09K 11/516; C09K 11/617; C09K 11/646
See application file for complete search history.

(56) References Cited

U.S. PATENT DOCUMENTS

| | | | | |
|---|---|---|---|---|
| 2013/0264937 | A1* | 10/2013 | Sakuta | ............... C09K 11/0883 |
| | | | | 313/503 |
| 2015/0054400 | A1* | 2/2015 | Murphy | .................... F21V 9/38 |
| | | | | 313/503 |
| 2015/0361335 | A1* | 12/2015 | Murphy | ............... C09K 11/617 |
| | | | | 252/301.4 F |
| 2019/0074412 | A1 | 3/2019 | Murphy et al. | |

FOREIGN PATENT DOCUMENTS

| | | |
|---|---|---|
| JP | 2010254933 A | 11/2010 |
| JP | 2011012091 A | 1/2011 |
| JP | 2012104814 A | 5/2012 |
| JP | 2019519100 A | 7/2019 |
| WO | 2012050199 A1 | 4/2012 |

\* cited by examiner

*Primary Examiner* — Matthew E. Hoban

(74) *Attorney, Agent, or Firm* — Hunton Andrews Kurth LLP (57) ABSTRACT

Provided is a method for producing a fluoride phosphor. The method includes: providing a first solution containing an element $M^1$ containing at least one selected from the group consisting of group 13 elements, manganese, and fluorine, a second solution containing an element $M^2$ containing at least one selected from the group consisting of group 4 elements and group 14 elements, and a third solution containing at least one selected from the group consisting of alkali metal elements; and adding the second solution and the third solution to the first solution at substantially the same time.

19 Claims, 1 Drawing Sheet

METHOD FOR PRODUCING FLUORIDE PHOSPHOR

CROSS-REFERENCE TO RELATED APPLICATIONS

This application claims priority to Japanese Patent Application No. 2021-110955, filed on Jul. 2, 2021, the disclosure of which is hereby incorporated by reference in its entirety.

BACKGROUND

Field of the Invention

The present disclosure relates to a method for producing a fluoride phosphor.

DESCRIPTION OF THE RELATED ART

Light emitting devices obtained by combining light emitting elements and phosphors are used in a wide range of fields such as lighting, on-vehicle lighting, displays, and liquid crystal backlights. For example, a phosphor used in a light emitting device for a liquid crystal backlight is required to have high color purity, i.e., a narrow half-value width of a luminescence peak. Japanese Laid-Open Patent Publication No. 2010-254933 discloses a fluoride phosphor activated with tetravalent manganese as a red light-emitting phosphor having a narrow half-value width of a luminescence peak.

SUMMARY

According to a first exemplary embodiment is provided a method for producing a fluoride phosphor, and the method includes: providing a first solution containing an element $M^1$ containing at least one selected from the group consisting of group 13 elements, manganese, and fluorine, a second solution containing an element $M^2$ containing at least one selected from the group consisting of group 4 elements and group 14 elements, and a third solution containing at least one selected from the group consisting of alkali metal elements; and adding the second solution and the third solution to the first solution at substantially the same time to obtain a first fluoride phosphor. According to an exemplary embodiment of the present disclosure, a method for manufacturing a fluoride phosphor capable of improving a luminous flux in a light emitting device can be provided.

DETAILED DESCRIPTION

The term "step" as used herein comprises not only an independent step but also a step not clearly distinguishable from another step as long as the intended purpose of the step is achieved. If multiple substances correspond to a component in a composition, the content of the component in the composition means the total amount of the multiple substances present in the composition unless otherwise specified. An upper limit and a lower limit of a numerical range described herein can arbitrarily be selected and combined. In this description, a relationship between a color name and a chromaticity coordinate, a relationship between a wavelength range of light and a color name of monochromatic light, etc. comply with HS 28110. A half-value width of a phosphor and a light emitting element means a wavelength width (full width at half maximum; FWHM) of the emission spectrum in which the emission intensity is 50% of the maximum emission intensity in the emission spectrum of the phosphor and the light emitting element. The median diameter of the phosphor is a volume-based median diameter and refers to a particle size corresponding to a volume accumulation of 50% from the small diameter side in the volume-based particle size distribution. The particle size distribution of the phosphor is measured by a laser diffraction method using a laser diffraction type particle size distribution measuring device. The average particle size of the phosphor is F.S.S.S.No. (Fisher Sub Sieve Sizer's No.) obtained by the air permeation method and is measured by using, for example, Fisher Sub-Sieve Sizer Model 95 manufactured by Fisher Scientific. Embodiments of the present invention will now be described in detail. However, the embodiments described below exemplify a method for manufacturing a fluoride phosphor for embodying the technical idea of the present invention, and the present invention is not limited to the method for manufacturing a fluoride phosphor described below.

Method for Producing Fluoride Phosphor

The method for producing a fluoride phosphor according to an exemplary embodiment of the present disclosure may include a providing step of providing a first solution containing an element $M^1$ containing at least one selected from the group consisting of group 13 elements, manganese, and fluorine, a second solution containing an element $M^2$ containing at least one selected from the group consisting of group 4 elements and group 14 elements, and a third solution containing at least one selected from the group consisting of alkali metal elements, and a synthesis step of synthesizing a fluoride phosphor by adding the second solution and the third solution to the first solution at substantially the same time to obtain a first fluoride phosphor.

A light emitting device including a fluorescent member containing a fluoride phosphor obtained by mixing three solutions having different components to synthesize a fluoride phosphor may achieve a high luminous flux and is excellent in durability. This may be probably because, for example, the components constituting the fluoride phosphor divided into three solutions are combined at the time of synthesis of the fluoride phosphor, so that particularly the distribution of the group 13 element is more uniformly controlled and, therefore, crystals of a fluoride phosphor having a more uniform desired composition are formed.

Providing Step

In the providing step, the first solution containing the element $M^1$, manganese (Mn), and fluorine (F), the second solution containing the element $M^2$, and the third solution containing the alkali metal element are provided.

The first solution contains the elements $M^1$, manganese and fluorine. The element $M^1$ includes at least one selected from the group consisting of the group 13 elements and may further include an element other than the group 13 elements as needed. Examples of the group 13 element include boron (B), aluminum (Al), gallium (Ga), and indium (In). The element $M^1$ contained in the first solution may preferably contain at least Al. The ratio of the number of moles of Al to the total number of moles of the element $M^1$ contained in the first solution may be, for example, 90 mol % or more, preferably 95 mol % or more, or 98 mol % or more. The element $M^1$ may be contained in the first solution as an ion or a complex ion or may be contained as a compound containing the element $M^1$.

Examples of an element $M^1$ source constituting the first solution include compounds containing the element $M^1$ such as a salt of the element $M^1$, a hydroxide of the element $M^1$, and an oxide of the element $M^1$. Examples of the salt of the element $M^1$ include halides containing halogens such as fluorine and chlorine, sulfates, and nitrates. One type of the element $M^1$ source constituting the first solution may be used alone, or two or more types thereof may be used in combination. Specifically, when the $M^1$ source contains aluminum (Al), examples of the aluminum compound serving as the $M^1$ source include hydroxides such as $Al(OH)_3$ and hexafluoroaluminates such as $K_3AlF_6$.

The element $M^1$ source concentration in the first solution may be, for example, 0.01 mass % or more and 15.0 mass % or less, preferably 0.05 mass % or more, or 0.1 mass % or more and may be preferably 10.0 mass % or less, or 5.0 mass % or less.

The manganese contained in the first solution may be in the form of manganese ions or first complex ions containing manganese ions. The manganese ion may contain, for example, tetravalent manganese ions. A manganese source may be a compound containing manganese, and specific examples thereof include $K_2MnF_6$, $KMnO_4$, and $K_2MnCl_6$. Among them, hexafluoromanganese such as $K_2MnF_6$ may stably be present in hydrofluoric acid as $MnF_6$ complex ions while maintaining the oxidation number (tetravalent) capable of activating the fluoride phosphor and is therefore preferable. Among the manganese sources, those containing an alkali metal such as potassium may also serve as a portion of an alkali metal source contained in the third solution. One type of the manganese source constituting the first solution may be used alone, or two or more types thereof may be used in combination.

The lower limit of the manganese concentration in the first solution may be, for example, 0.01 mass % or more, preferably 0.03 mass % or more, 0.05 mass % or more, or 0.1 mass % or more. The upper limit of the manganese concentration in the first solution may be, for example, 50 mass % or less, preferably 40 mass % or less, 30 mass % or less, or 10 mass % or less.

The fluorine contained in the first solution may be in the form of fluoride ions, hydrogen fluoride, or complex ions containing fluoride ions. The lower limit of the concentration of fluorine in the first solution, for example, as a hydrogen fluoride concentration, may be, for example, 20 mass % or more, preferably 25 mass % or more, or 30 mass % or more. The upper limit of the hydrogen fluoride concentration in the first solution may be, for example, 80 mass % or less, preferably 75 mass % or less, or 70 mass % or less. When the hydrogen fluoride concentration is 30 mass % or more, the stability of the manganese source (e.g., $K_2MnF_6$) constituting the first solution to hydrolysis is improved, and the fluctuation of the tetravalent manganese concentration in the first solution is suppressed. As a result, an amount of activated manganese contained in the obtained fluoride phosphor may easily be controlled, and the variation or fluctuation in the luminous efficiency in the fluoride phosphor tends to be suppressed. When the hydrogen fluoride concentration is 70 mass % or less, a decrease in the boiling point of the first solution is suppressed, and the generation of hydrogen fluoride gas is suppressed. As a result, the hydrogen fluoride concentration in the first solution may easily be controlled, and the variation or fluctuation in the particle diameter of the obtained fluoride phosphor may effectively be suppressed.

The first solution may be prepared, for example, by mixing and dissolving the element $M^1$ source, the manganese source, and the fluorine source in a liquid medium. The liquid medium constituting the first solution may contain at least water and may be a hydrofluoric acid aqueous solution also serving as the fluorine source in the first solution. The first solution may preferably be prepared by dissolving the element $M^1$ source and the manganese source in a hydrofluoric acid aqueous solution.

The second solution contains the element $M^2$. The element $M^2$ includes at least one selected from the group consisting of the group 4 elements and the group 14 elements and may further contain an element other than the group 4 elements and the group 14 elements, if necessary. Examples of the group 4 elements include titanium (Ti), zirconium (Zr), and hafnium (Hf) Examples of the group 14 elements include carbon (C), silicon (Si), germanium (Ge), tin (Sn), and lead (Pb). The element $M^2$ contained in the second solution may preferably contain at least one selected from the group consisting of at least Ti, Zr, Hf, Si, Ge, and Sn, may contain Si or Si and Ge, and may contain at least Si. The ratio of the number of moles of Si to the total number of moles of the element $M^2$ contained in the second solution may be, for example, 90% or more, preferably 93% or more, or 95% or more. The element $M^2$ may be contained in the second solution as ions, complex ions, or a compound containing the element $M^2$.

The lower limit of the element $M^2$ source concentration in the second solution may be, for example, 1 mass % or more, preferably 2 mass % or more, or 3 mass % or more. The upper limit of the element $M^2$ source concentration in the second solution may be, for example, 50 mass % or less, preferably 40 mass % or less, 30 mass % or less, or 10 mass % or less.

The second solution may contain at least second complex ions containing the element $M^2$ and fluorine ions as the element $M^2$ source. For example, when the second complex ions contain Si, a second complex ion source is preferably a compound containing silicon and fluorine and having excellent solubility in a solution. Specific examples of the second complex ion source include $H_2SiF_6$, $Na_2SiF_6$, $(NH_4)_2SiF_6$, $Rb_2SiF_6$, and $Cs_2SiF_6$. Among them, $H_2SiF_6$ has high solubility in water and does not contain an alkali metal element as an impurity and is therefore preferable. One type of the second complex ion source constituting the second solution may be used alone or two or more types thereof may be used in combination.

When the second solution contains $H_2SiF_6$ (hexafluorosilicic acid) as the element $M^2$ source, the content of hexafluorosilicic acid relative to the total content of the element $M^2$ source may be, for example, 80% or more, preferably 90% or more, or 95% or more, or substantially only hexafluorosilicic acid may be contained. In an exemplary embodiment, the second solution may consist essentially of hexafluorosilicic acid and water. As used herein, "substantially" means that impurities are allowed to be inevitably mixed.

The second solution may be prepared, for example, by dissolving the element $M^2$ source in a liquid medium. The liquid medium may contain at least water, for example. In an embodiment, the second solution may be prepared by dissolving the element $M^2$ source (e.g., hexafluorosilicic acid) in water.

The third solution contains an alkali metal. Examples of the alkali metal include lithium (Li), sodium (Na), potassium (K), rubidium (Rb), and cesium (Cs), and may contain at least one selected from the group consisting of these. The alkali metal may contain at least K. The ratio of the number of moles of K to the total number of moles of alkali metal contained in the third solution may be, for example, 0.8 or more, preferably 0.9 or more, or 0.95 or more. The alkali metal may be contained as ions in the third solution.

A portion of the alkali metal contained in the third solution may be replaced with ammonium ions ($NH_4^+$). When a portion of the alkali metal is replaced with ammonium ions, the ratio of the number of moles of ammonium ions to the total number of moles of alkali metal contained in the third solution may be, for example, 0.10 or less, preferably 0.05 or less, or 0.03 or less. The lower limit of the ratio of the number of moles of ammonium ions may be, for example, more than 0, preferably 0.005 or more.

The lower limit of the alkali metal source concentration in the third solution may be, for example, 3 mass % or more, preferably 5 mass % or more, or 10 mass % or more. The upper limit of the alkali metal source concentration in the third solution may be, for example, 70 mass % or less, preferably 60 mass % or less, 50 mass % or less, or 40 mass % or less.

The third solution may be prepared, for example, by dissolving an alkali metal element source in a liquid medium. Examples of the alkali metal source include halides, hydroxides, acetates, and carbonates of alkali metal. Specific examples of the alkali metal source include water-soluble potassium salts such as KF, $KHF_2$, KOH, KCl, KBr, KI, $CH_3COOK$, and $K_2CO_3$. Among these, $KHF_2$ may be dissolved without lowering the concentration of hydrogen fluoride in the third solution, is highly safe because of little heat of dissolution, and is therefore preferable. Examples of the alkali metal source other than the potassium source include $NaHF_2$, $Rb_2CO_3$, and $Cs_2CO_3$. One type of the alkali metal source constituting the third solution may be used alone or two or more types thereof may be used in combination.

The liquid medium constituting the third solution may contain at least water, for example. The third solution may further contain hydrogen fluoride, and the liquid medium may be a hydrofluoric acid aqueous solution. The lower limit of the hydrogen fluoride concentration in the third solution may be, for example, S mass % or more, preferably 10 mass % or more, or 15 mass % or more. The upper limit of the hydrogen fluoride concentration in the third solution may be, for example, 80 mass % or less, preferably 70 mass % or less, 60 mass % or less, or 50 mass % or less.

The third solution may be prepared, for example, by dissolving an alkali metal source in a liquid medium. In an embodiment, the third solution may be prepared by dissolving an alkali metal source (e.g., $KHF_2$) in an aqueous hydrofluoric acid solution.

Synthesis Step

In the synthesis step, the second solution and the third solution are added to the provided first solution at substantially the same time to synthesize a fluoride phosphor. By mixing the first solution, the second solution, and the third solution, manganese, the alkali metal ions, the ions containing the element $M^1$, and the ions containing the element $M^2$ react at a predetermined ratio to precipitate crystals of the desired fluoride phosphor including the first fluoride phosphor.

In the synthesis step, the second solution and the third solution are added to the first solution. Adding at substantially the same time means that the addition of the second solution and the addition of the third solution are performed in an overlapping manner. Therefore, the start of addition of the second solution and the start of addition of the third solution may not necessarily coincide with each other, and the end of addition of the second solution and the end of addition of the third solution may not necessarily coincide with each other. The addition of the second solution to the first solution and the addition of the third solution to the first solution may be performed independently or each other. Therefore, a flow path for adding the second solution may be separated from a flow path for adding the third solution.

In the synthesis step, the second solution and the third solution may be added while stirring the first solution. The stirring method may appropriately be selected from methods usually used depending on a producing scale, a reaction tank, etc. Regarding the temperature in the synthesis step, for example, the temperature of the first solution may be controlled to 5° C. or higher and 50° C. or lower, or 15° C. or higher and 30° C. or lower.

The addition of the second solution and the third solution in the synthesis step may be performed dropwise to the first solution or may be continuous addition. Regarding the addition rate, for example, the addition amount of each of the prepared second and third solutions per minute may be 1 vol. % or more and 20 vol. % or less of each of the initial liquid amounts and may be preferably 3 vol. % or more and 15 vol. % or less of the initial liquid amount. The time required for adding the second solution and the time required for adding the third solution in the synthesis step may appropriately be selected depending on the respective prepared liquid amounts etc. The time required for adding the second solution and the third solution may be, for example, 1 minute or more and 20 minutes or less, preferably 2 minutes or more and 15 minutes or less. The time required for adding the second solution and the time required for adding the third solution may be the same or different and may be preferably the same.

In an embodiment of the method for producing a fluoride phosphor, the second solution and the third solution are added independently and substantially simultaneously to the first solution to mix the three solutions. In another embodiment of the method for producing a fluoride phosphor, the first solution and the second solution may be added to the third solution independently and substantially simultaneously to mix the three solutions, the first solution and the third solution may be added to the second solution independently and substantially simultaneously to mix the three solutions, or the first solution, the second solution, and the third solution may each be added to the same container independently and substantially simultaneously to mix the three solutions.

When mixing the first solution, the third solution, and the third solution, considering a difference between the charged composition of the first solution, the second solution, and the third solution, and the chemical composition of the obtained fluoride phosphor, it is preferable to appropriately adjust the mixing ratio of the first solution, the second solution, and the third solution so that the desired chemical composition of the fluoride phosphor is achieved as a product.

The fluoride phosphor precipitated in the synthesis step may be recovered by solid-liquid separation by filtration etc. The fluoride phosphor may be washed with a solvent such as ethanol, isopropyl alcohol, water, and acetone. A drying treatment may further be performed, and the drying is usually performed at 50° C. or higher, preferably 55° C. or higher, more preferably 60° C. or higher, and usually 150° C. or lower, preferably 120° C. or lower, more preferably 110° C. or lower. The drying time may be any time as long as at least a part of the water adhering to the fluoride phosphor may be evaporated and is about 10 hours for example.

The method for producing a fluoride phosphor may further include a heat treatment step of heat-treating the obtained first fluoride phosphor in contact with a fluorine-containing substance at a heat treatment temperature of 400° C. or higher to obtain a heat-treated second fluoride phosphor.

By heat-treating the first fluoride phosphor in contact with the fluorine-containing compound, fluorine atoms are supplied to a region where fluorine atoms are deficient in the crystal structure of the fluoride phosphor, so that defects in the crystal structure are considered to be further reduced. This probably further improves the luminance. Additionally, this probably further improves the durability of the fluoride phosphor.

The fluorine-containing substance used in the heat treatment step may be in a solid state, a liquid state, or a gaseous state at room temperature. Examples of the fluorine-containing substance in the solid state or the liquid state include $NH_4F$. Examples of the fluorine-containing substance in the gaseous state include $F_2$, $CHF_3$, $CF_4$, $NH_4HF_2$, HF, $SiF_4$, $KrF_4$, $XeF_2$, $XeF_4$, and $NF_3$, and the fluorine-containing substance may be at least one selected from the group consisting thereof and may be preferably at least one selected from the group consisting of $F_2$ and HF.

When the fluorine-containing substance is in the solid state or the liquid state at ordinary temperature, the first fluoride phosphor and the fluorine-containing substance may be mixed and brought into contact with each other. The first fluoride phosphor may be mixed with the fluorine-containing substance accounting for, for example, 1 mass % or more and 20 mass % or less, preferably 2 mass % or more and 10 mass %, in terms of mass of fluorine atoms, based on 100 mass % of the total amount of the first fluoride phosphor and the fluorine-containing substance.

The temperature at the time of mixing the first fluoride phosphor and the fluorine-containing substance may be, for example, a temperature lower than the heat treatment temperature from room temperature (20° C.±5° C.) or may be the heat treatment temperature. Specifically, the temperature may be 20° C. or higher and lower than 400° C., or 400° C. or higher. When the temperature at the time of bringing the first fluoride phosphor into contact with the fluorine-containing substance in a solid state or liquid state at ordinary temperature is 20° C. or higher and lower than 400° C., the heat treatment is performed at a temperature of 400° C. or higher after the first fluoride phosphor and the fluorine-containing substance are brought into contact with each other.

When the fluorine-containing substance is a gas, the first fluoride phosphor may be placed in an atmosphere containing the fluorine-containing substance and brought into contact therewith. The atmosphere containing the fluorine-containing substance may contain an inert gas such as a rare gas or nitrogen in addition to the fluorine-containing substance. In this case, the concentration of the fluorine-containing substance in the atmosphere may be, for example, 3 vol. % or more and 35 vol. % or less, preferably 5 vol. % or more or 10 vol. % or more, and preferably 30 vol. % or less or 25 vol. % or less.

The heat treatment may be performed by retaining the heat treatment temperature for a predetermined time while the first fluoride phosphor and the fluorine-containing substance are in contact with each other. The heat treatment temperature may be, for example, 400° C. or higher, preferably a temperature higher than 400° C., 425° C. or higher, 450° C. or higher, or 480° C. or higher. The upper limit of the heat treatment temperature may be, for example, less than 600° C., preferably 580° C. or lower, 550° C. or lower, or 520° C. or lower.

When the heat treatment temperature is equal to or higher than the lower limit, fluorine atoms are sufficiently supplied to the first fluoride phosphor, and the luminance of the second fluoride phosphor obtained by the heat treatment tends to be further improved. When the heat treatment temperature is not more than the upper limit value, the decomposition of the second fluoride phosphor obtained by the heat treatment is more effectively suppressed, and the luminance of the obtained second fluoride phosphor tends to be further improved.

The heat treatment time in the heat treatment step, i.e., the time for retaining the heat treatment temperature may be, for example, 1 hour or more and 40 hours or less, preferably 2 hours or more or 3 hours or more, and preferably 30 hours or less, 10 hours or less, or 8 hours or less. When the heat treatment time at the heat treatment temperature is within the range, fluorine atoms may sufficiently be supplied to the first fluoride phosphor. As a result, the crystal structure of the second fluoride phosphor becomes more stable, and a second fluoride phosphor having high luminance tends to be obtained.

The pressure in the heat treatment step may be atmospheric pressure, 0.101 MPa, more than atmospheric pressure and 5 MPa or less, or more than atmospheric pressure and 1 MPa or less.

The method for producing a fluoride phosphor may include a granulating step in which treatments such as crushing, pulverization, and classification operations are combined and performed for the heat-treated product obtained after the heat treatment step. A powder having a desired particle size may be obtained by the granulating step.

Fluoride Phosphor

The fluoride phosphor obtained by the method for producing a fluoride phosphor described above may be the first fluoride phosphor or the second fluoride phosphor. The fluoride phosphor has a composition containing the alkali metal, the element $M^1$, the element $M^2$, manganese (Mn), and fluorine (F). In the composition of the fluoride phosphor, when the total number of moles of the alkali metal is assumed as 2, the total number of moles of the element $M^1$, the element $M^2$, and Mn may be 0.9 or more and 1.1 or less, preferably 0.95 or more and 1.05 or less, or 0.97 or more and 1.03 or less. The ratio of the number of moles of the element $M^1$ to the total number of moles of the alkali metal of 2 may be, for example, more than 0 and 0.2 or less, preferably more than 0 and 0.1 or less, 0.002 or more and 0.07 or less, or 0.003 or more and 0.05 or less. The ratio of the number of moles of Mn to the total number of moles of the alkali metal of 2 may be, for example, more than 0 and 0.2 or less, preferably 0.005 or more and 0.15 or less, and 0.01 or more and 0.12 or less, or 0.015 or more and 0.1 or less. The ratio of the number of moles of F to the total number of moles of the alkali metal of 2 may be, for example, 5.9 or more and 6.1 or less, preferably 5.92 or more and 6.05 or less, or 5.95 or more and 6.025 or less. In the composition of the fluoride phosphor, the ratio of the number of moles of the element $M^2$ to the total number of moles of the alkali metal of 2 may be, for example, 0.7 or more and 1.1 or less, preferably 0.8 or more and 1.03 or less, 0.85 or more and 1.01 or less, or 0.90 or more and less than 0.96. In the composition of the fluoride phosphor, the ratio of the number of moles of the element $M^1$ to the number of moles of the element $M^2$ may be, for example, 0.001 or more and 0.1 or less, preferably 0.002 or more and 0.07 or less, or 0.003 or more and 0.05 or less.

The fluoride phosphor may have a composition represented by Formula (I).

$$M^3{}_2[M^2{}_pM^1{}_q Mn_r F_s] \qquad (I)$$

In Formula (I), $M^1$ contains at least one selected from the group consisting of group 13 elements. $M^2$ contains at least one selected from the group consisting of group 4 elements and group 14 elements. $M^3$ contains at least one selected from the group consisting of alkali metals. Mn may be a tetravalent Mn ion. In Formula (I), p, q, r, and s may satisfy $0.95 \le p+q+r \le 1.1$, $0 < q \le 0.2$, $0 \le r \le 0.2$, $5.9 \le s \le 6.1$. Preferably, $0.95 \le q+q+r \le 1.05$ or $0.97 \le +q+r \le 1.03$, $0 < q \le 0.1$, $0.002 \le q \le 0.07$ or $0.003 \le q \le 0.05$, $0.005 \le r \le 0.15$, $0.01 \le r \le 0.12$ or $0.015 \le r \le 0.1$, $5.92 \le s \le 6.05$ or $5.95 \le s \le 6.025$.

$M^1$ may be at least one selected from the group consisting of group 13 elements. Examples of the group 13 element include B, Al, Ga, and In. $M^1$ may preferably contain at least Al. The ratio of the number of moles of Al to the total number of moles of $M^1$ in the composition of the fluoride phosphor may be, for example, 0.85 or more, preferably 0.9 or more, or 0.95 or more.

$M^2$ may be at least one selected from the group consisting of group 4 elements and group 14 elements. Examples of the group 4 element include Ti, Zr, and Hf. Examples of the group 14 element include C, Si, Ge, Sn, and Pb. $M^2$ may be at least one selected from the group consisting of at least Ti, Zr, Hf, Si, Ge, and Sn, preferably Si or Si and Ge, and may be Si. The ratio of the number of moles of Si to the total number of moles of $M^2$ in the composition of the fluoride phosphor may be, for example, 0.8 or more, preferably 0.85 or more, or 0.9 or more.

$M^3$ may be at least one selected from the group consisting of alkali metals. Examples of the alkali metal include Li, Na, K, Rb, and Cs, and at least one selected from the group consisting of these may be used. $M^3$ may contain at least K. The ratio of the number of moles of K to the total number of moles of $M^3$ in the composition of the fluoride phosphor may be, for example, 0.7 or more, preferably 0.8 or more, or 0.85 or more.

In $M^3$, a portion of the alkali metal may be replaced with ammonium ions ($NH_4^+$). When a portion of the alkali metal is replaced with ammonium ions, the ratio of the number of moles of ammonium ions to the total number of moles of alkali metal contained in the composition of the fluoride phosphor may be, for example, 0.10 or less, preferably 0.05 or less, or 0.03 or less. The lower limit of the ratio of the number of moles of ammonium ions may be, for example, more than 0, preferably 0.005 or more.

The average particle diameter of the fluoride phosphor may be, for example, 5 μm or more and 90 μm or less, preferably 10 μm or more, or 15 μm or more, and preferably 70 μm or less or 50 μm or less, from the viewpoint of improving the emission intensity of the light emitting device.

The volume-based center particle diameter of the fluoride phosphor may be, for example, 5 μm or more and 90 μm or less, preferably 10 μm or more, 15 μm or more, or 20 μm or more, and preferably 70 μm or less, 60 μm or less, or 50 μm or less, from the viewpoint of improving the emission intensity of the light emitting device. The particle size distribution of the fluoride phosphor may exhibit a single peak particle size distribution from the viewpoint of improving the emission intensity of the light emitting device, for example.

The fluoride phosphor is, for example, a phosphor activated with tetravalent manganese, absorbs light in a short wavelength region of visible light, and emits red light. The excitation light may mainly be light in the blue region, and the peak wavelength of the excitation light may be, for example, in the wavelength range of 380 nm or more and 485 nm or less. The luminescence peak wavelength in the emission spectrum of the fluoride phosphor may be, for example, in the wavelength range of 610 nm or more and 650 nm or less. The half-value width in the emission spectrum of the fluoride phosphor may be, for example, 10 nm or less.

The fluoride phosphor may include a cubic crystal structure, may include other crystal structures such as a hexagonal system in addition to the cubic crystal structure, or may substantially be composed only of a cubic crystal structure. The term "substantially" as used herein means that the content percentage of the crystal structure other than the cubic system is less than 0.5%. When the fluoride phosphor contains a cubic crystal structure, the lattice constant thereof may be, for example, 0.81380 nm or more, preferably 0.81400 nm or more, or 0.81425 nm or more. The upper limit of the lattice constant may be, for example, 0.81500 nm or less. The fluoride phosphor containing a cubic crystal structure and the lattice constant thereof may be evaluated by measuring an X-ray diffraction pattern of the fluoride phosphor. The X-ray diffraction pattern is measured by using, for example, CuKα rays (λ=0.15418 nm, a tube voltage of 40 kV, a tube current of 40 mA) as an X-ray source.

In an infrared absorption spectrum, the fluoride phosphor may have an absorption peak in a wavenumber range of, for example, 590 $cm^{-1}$ or more and 610 $cm^{-1}$ or less, preferably 593 $cm^{-1}$ or more and 607 $cm^{-1}$ or less, or 595 $cm^{-1}$ or more and 605 $cm^{-1}$ or less. An absorption peak in a predetermined wavenumber range is considered to be derived from, for example, an Al—F bond in a cubic crystal structure. The infrared absorption spectrum is measured by an attenuated total reflection (ATR) method, for example.

The fluoride phosphor may have unevenness, grooves, etc. on the particle surface thereof. The state of the particle surface may be evaluated, for example, by measuring an angle of repose of powder composed of the fluoride phosphor. The angle of repose of the powder composed of the fluoride phosphor may be, for example, 70° or less, preferably 65° or less, or 60° or less. The lower limit of the angle of repose is, for example, 30° or more. The angle of repose is measured, for example, by the infusion method.

Light Emitting Device

The light emitting device includes a first phosphor containing the fluoride phosphor and a light emitting element having a luminescence peak wavelength in a wavelength range of 380 nm or more and 485 nm or less.

Figure 1:
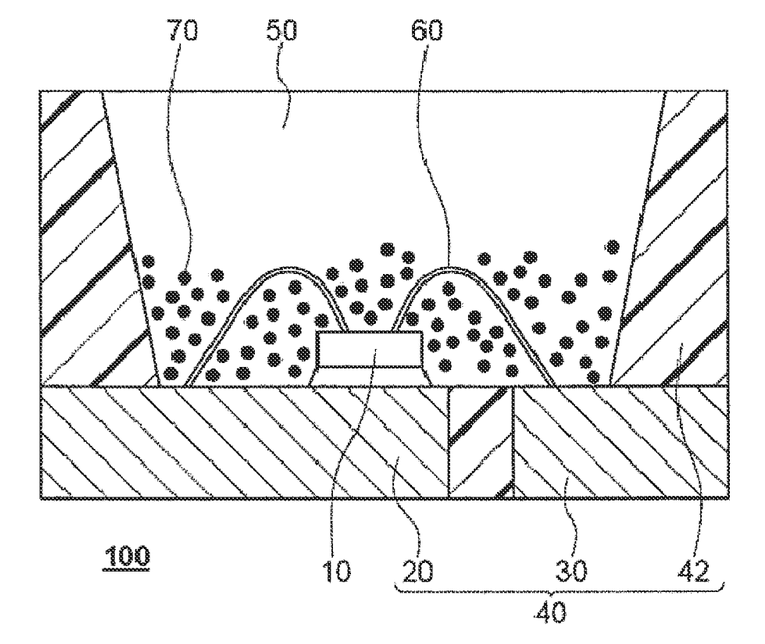
FIG. 1 is a schematic cross-sectional view showing an exemplary light emitting device including a fluoride phosphor.

An example of a light emitting device will be described with reference to a drawing. FIG. 1 is a schematic cross-sectional view showing an example of the light emitting device according to this embodiment. This light emitting device is an example of a surface mount type light emitting device. A light emitting device 100 includes a light emitting element 10 and a molded body 40 on which the light emitting element 10 is placed. The molded body 40 has a first lead 20 and a second lead 30 and is integrally molded from a thermoplastic resin or a thermosetting resin. The molded body 40 is provided with a recess having a bottom surface and a side surface, and the light emitting element 10 is placed on the bottom surface of the recess. The light emitting element 10 has a pair of positive and negative electrodes, and the pair of positive and negative electrodes is electrically connected to the first lead 20 and the second lead 30 via wires 60. The light emitting element 10 is sealed by a fluorescent member 50. The fluorescent member 50 contains a phosphor 70 containing a fluoride phosphor converting a wavelength of the light from the light emitting element 10. The phosphor 70 may include a first phosphor containing the fluoride phosphor and a second phosphor emitting light having a luminescence peak wavelength in a wavelength range different from that of the fluoride phosphor due to light from the light emitting element 10.

The fluorescent member may contain a resin and a phosphor. Examples of the resin constituting the fluorescent member include silicone resin and epoxy resin. The fluorescent member may further contain a light diffusing material in addition to the resin and the phosphor.

The light emitting element emits light having a luminescence peak wavelength in a wavelength range of 380 nm or more and 485 nm or less, which is a short wavelength region of visible light. The light emitting element may be an excitation light source exciting the fluoride phosphor. The light emitting element preferably has a luminescence peak wavelength in a range of 380 nm or more and 480 nm or less. For example, a semiconductor light emitting element using a nitride-based semiconductor may be used as the light emitting element. The half-value width of the emission peak in the emission spectrum of the light emitting element is preferably 30 nm or less, for example.

The fluoride phosphor is contained, for example, in a fluorescent member covering the light emitting element. In the light emitting device with the light emitting element covered with the fluorescent member containing the fluoride phosphor, a portion of the light emitted from the light emitting element is absorbed by the fluoride phosphor and emitted as red light.

The second phosphor may be contained in the fluorescent member in the same manner as the first phosphor, for example. The second phosphor may have a composition represented by Formula (IIa), (IIb), (IIc), (IId), (IIe), (IIf), (IIg), or (IIh).

$Si_{6-1}Al_tO_tN_{8-t}:Eu$ (IIa)

(where t is a number satisfying 0<t≤4.2)

$(Ca,Sr,Ba)_8MgSi_4O_{16}(F,Cl,Br)_2:Eu$ (IIb)

$(Ba,Sr,Ca,Mg)_2SiO_4:Eu$ (IIc)

$(Y,Lu,Gd,Tb)_3(Al,Ga)_5O_{12}:Ce$ (IId)

$CsPb(F,Cl,Br,I)_3$ (IIe)

$(La,Y,Gd)_3Si_6N_{11}:Ce$ (IIf)

$(Sr,Ca)LiAl_3N_4:Eu$ (IIg)

$(Ca,Sr)AlSiN_3:Eu$ (IIh)

In the formulae, multiple elements separated by commas (,) in the formula representing the composition of the phosphor means that at least one element among multiple elements is contained in the composition. In the formula representing the composition of the phosphor, a mother crystal is represented before a colon (:), and an activating element is represented after a colon (:).

EXAMPLES

The present invention will hereinafter specifically be described with reference to Examples; however, the present invention is not limited to these Examples.

Example 1

Providing Step

A first solution was prepared by weighing and dissolving 3.93 g of $K_2MnF_6$ and 3.90 g of $Al(OH)_3$ in a mixed solution of 220 g of hydrofluoric acid (55 w %) and 20 g of pure water. A second solution was prepared by mixing 97.3 g of an $H_2SiF_6$ aqueous solution (40 wt %) and 20 g of pure water. Subsequently, 63.10 g of $KHF_2$ was weighed and dissolved in a mixed solution of 57.8 g of hydrofluoric acid (55 wt %) and 20 g of pure water to prepare a third solution.

Synthesis Step

While the first solution was stirred at room temperature (25° C.), the second solution and the third solution were added dropwise independently of each other and substantially simultaneously over about 5 minutes. An obtained precipitate was separated into solid and liquid, washed with ethanol, and dried at 100° C. for 10 hours. Subsequently, in an atmosphere having a fluorine gas ($F_2$) concentration of 20 vol. % and a nitrogen gas ($N_2$) concentration of 80 vol. %, the heat treatment is performed in contact with fluorine gas at a temperature of 500° C. and a heat treatment time of 5 hours to prepare fluoride particles of Example 1.

Example 2

A fluoride phosphor of Example 2 was prepared in the same manner as in Example 1 except that $K_2MnF_6$ and $Al(OH)_3$ were dissolved only in 220 g of hydrofluoric acid without using pure water in the preparation of the first solution, that the amount of pure water was changed from 20 g to 15 g in the preparation of the second solution, and that the amount of pure water was changed from 20 g to 15 g in the preparation of the third solution.

Example 3

A fluoride phosphor of Example 3 was prepared in the same manner as in Example 1 except that 4.32 g of $K_2MnF_6$ and 13.70 g of $Al(OH)_3$ were weighed and dissolved in 263 g of hydrofluoric acid (55 wt %) to prepare the first solution, that 95.0 g of the $H_2SiF_6$ aqueous solution (40 wt %) was used as the second solution, and that $KHF_2$ was dissolved in 57.8 g of hydrofluoric acid (55 wt %) without using pure water in the preparation of the third solution.

Comparative Example 1

A solution A was prepared by weighing and dissolving 29.20 g of $KHF_2$ and 11.13 g of $K_3AlF_6$ in 195 g of hydrofluoric acid (55 wt %). A solution B was prepared by weighing and dissolving 4.74 g of $K_2MnF_6$ in a mixed solution of 60.8 g of $H_2SiF_6$ aqueous solution (40 wt %), 225 g of hydrofluoric acid (55 wt %), and 45 g of pure water.

While the solution B was stirred at room temperature, the solution A was added dropwise over about 2 minutes while stirring at room temperature. An obtained precipitate was separated into solid and liquid, washed with ethanol, and dried at 100° C. for 10 hours to prepare fluoride particles of Comparative Example 1.

Comparative Example 2

A fluoride phosphor of Comparative Example 2 was prepared in the same manner as in Comparative Example 1 except that 21.42 g of $KHF_2$ and 20.34 g of $K_3AlF_6$ were weighed and dissolved in 205 g of hydrofluoric acid (55 wt %) to prepare the solution A and that 4.74 g of $K_2MnF_6$ was weighed and dissolved in a mixed solution of 60.8 g of $H_2SiF_6$ aqueous solution (40 wt %), 190 g of hydrofluoric acid (55 wt %), and 30 g of pure water to prepare the solution B.

Comparative Example 3

A fluoride phosphor of Comparative Example 3 was prepared in the same manner as in Comparative Example 1 except that 5.86 g of $KHF_2$ and 38.74 g of $K_3AlF_6$ were weighed and dissolved in 225 g of hydrofluoric acid (55 wt %) to prepare the solution A and that 4.74 g of K $MnF_6$ was weighed and dissolved in a mixed solution of 60.8 g of $H_2SiF_6$ aqueous solution (40 wt %) and 110 g of hydrofluoric acid (55 wt %) to prepare the solution B.

Average Particle Diameter

The average particle diameter of the fluoride phosphor obtained as described above was measured by using Fisher Sub-Sieve Sizer Model 95 (manufactured by Fisher Scientific). The results are shown in Table 1.

Central Particle Diameter

The central particle size of the fluoride phosphor obtained as described above was measured by using a laser diffraction particle diameter distribution device (MASTER SIZER 2000 manufactured by MALVERN). The results are shown in Table 1.

Composition

Each of the obtained fluoride phosphors of Examples and Comparative Examples was subjected to composition analysis by inductively coupled plasma-atomic emission spectroscopy (ICP-AES) to calculate a molar content ratio of each element when the potassium contained in the composition was 2 mol. The molar content ratio of fluorine was calculated by subtracting the molar content ratio of aluminum from the total molar content ratio of fluorine and aluminum assuming as 6 mol. The results are shown in Table 1.

Production of Light Emitting Device

Each fluoride phosphor obtained as described above was used as the first phosphor. A β-sialon phosphor having a composition represented by $Si_{5.81}Al_{0.19}O_{0.19}N_{7.81}$:Eu and a luminescence peak wavelength near 540 nm was used as the second phosphor. A resin composition was obtained by mixing the phosphor 70 containing the first phosphor and the second phosphor so that x is 0.280 and y is around 0.270 in chromaticity coordinates in the CIE1931 color system, with a silicone resin. The molded body 40 having a recess as shown in FIG. 1 was prepared, and after the light emitting element 10 made of a gallium nitride-based compound semiconductor having a luminescence peak wavelength of 451 nm was placed on the first lead 20 on the bottom surface of the recess, the electrodes of the light emitting element 10 were respectively connected to the first lead 20 and the second lead 30 by the wires 60. The resin composition was further injected into the recess of the molded body 40 by using a syringe so as to cover the light emitting element 10, and the resin composition was cured to form a fluorescent member to produce the light emitting device.

Relative Luminous Flux

The luminous flux of the light emitting device using each of the fluoride phosphors was measured by using a total luminous flux measuring device using an integrating sphere. Assuming that the luminous flux of the light emitting device using the fluoride phosphor according to Comparative Example 1 was 100%, the luminous flux of the light emitting device using the other fluoride phosphors was obtained as a relative luminous flux (initial luminous flux). The results are shown in Table 1.

Durability Evaluation

The light emitting device obtained as described above was continuously lit at a current of 150 mA in a high temperature environmental test machine at 85° C., and a difference from an initial value of the x value in the chromaticity coordinates after 500 hours was defined as Δx to evaluate the durability of the light emitting device. The results are shown in Table 1.

TABLE 1

|  | Average Particle Diameter (μm) | Central Particle Diameter (μm) | Composition (molar ratio) | | | | | Relative Luminous Flux (lm) | Durability Δx |
| --- | --- | --- | --- | --- | --- | --- | --- | --- | --- |
|  |  |  | K | Si | F | Mn | Al |  |  |
| Example 1 | 26.5 | 34.9 | 2.000 | 0.946 | 5.996 | 0.050 | 0.004 | 103.4 | 0.003 |
| Example 2 | 24.5 | 33.9 | 2.000 | 0.940 | 5.991 | 0.051 | 0.009 | 104.0 | 0.004 |
| Example 3 | 27.0 | 47.5 | 2.000 | 0.919 | 5.968 | 0.049 | 0.032 | 102.4 | 0.005 |
| Comparative Example 1 | 27.0 | 42.1 | 2.000 | 0.947 | 5.996 | 0.049 | 0.004 | 100.0 | 0.006 |
| Comparative Example 2 | 25.0 | 40.6 | 2.000 | 0.942 | 5.991 | 0.049 | 0.009 | 99.7 | 0.006 |
| Comparative Example 3 | 22.5 | 39.5 | 2.000 | 0.932 | 5.981 | 0.049 | 0.019 | 98.0 | 0.008 |

As shown in Table 1, the light emitting devices manufactured by using the fluoride phosphors obtained by the producing method of Examples had higher initial luminous flux and more excellent durability than Comparative Examples.

The fluoride phosphor obtained by the producing method of the present disclosure is particularly used in a light emitting device using a light emitting diode as an excitation light source and may suitably be used for, for example, a light source for lighting, a light source for an LED display or a liquid crystal backlight, a traffic light, illumination type switches, various sensors, various indicators, and small strobes.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for producing a fluoride phosphor, comprising:
providing a first solution containing an element $M^1$ containing at least one selected from the group consisting of group 13 elements, manganese, and fluorine, a second solution containing an element $M^2$ containing at least one selected from the group consisting of group 4 elements and group 14 elements, and a third solution containing at least one selected from the group consisting of alkali metal elements; and
adding the second solution and the third solution to the first solution to obtain a first fluoride phosphor,
wherein a time period for adding the second solution to the first solution overlaps with a time period for adding the third solution to the first solution,
wherein the second solution and the third solution are added independently to the first solution, and
wherein the fluoride phosphor does not contain Na in the composition.

2. The method for producing a fluoride phosphor according to claim 1, wherein the element $M^1$ contains at least aluminum.

3. The method for producing a fluoride phosphor according to claim 1, wherein the element $M^2$ contains at least silicon.

4. The method for producing a fluoride phosphor according to claim 1, wherein the first solution contains an aluminum compound, hexafluoromanganate and hydrofluoric acid.

5. The method for producing a fluoride phosphor according to claim 1, wherein the second solution consists essentially of hexafluorosilicic acid and water.

6. The method for producing a fluoride phosphor according to claim 1, further comprising heat-treating the first fluoride phosphor in contact with a fluorine-containing substance at a heat treatment temperature of 400° C. or higher to obtain a second fluoride phosphor.

7. The method for producing a fluoride phosphor according to claim 6, wherein the fluorine-containing substance comprises at least one selected from the group consisting of $NH_4F$, $F_2$, $CHF_3$, $CF_4$, $NH_4HF_2$, HF, $SiF_4$, $KrF_4$, $XeF_2$, $XeF_4$, and $NF_3$.

8. The method for producing a fluoride phosphor according to claim 6, wherein when the fluorine-containing substance is in a solid state or a liquid state at a temperature in a range of 15° C. to 25° C., an amount of the fluorine-containing substance is 1 mass % or more and 20 mass % or less, in terms of mass of fluorine atoms, based on 100 mass % of a total amount of the first fluoride phosphor and the fluorine-containing substance.

9. The method for producing a fluoride phosphor according to claim 6, wherein when the fluorine-containing substance is a gas, an amount of the fluorine-containing substance in a heat-treating atmosphere is 3 vol. % or more and 35 vol. % or less.

10. The method for producing a fluoride phosphor according to claim 6, wherein the heat treatment temperature is 425° C. or higher and less than 600° C.

11. The method for producing a fluoride phosphor according to claim 6, wherein a heat treatment time is 1 hour or more and 40 hours or less.

12. The method for producing a fluoride phosphor according to claim 6, wherein a pressure in the heat-treating is atmospheric pressure or more and 5 MPa or less.

13. The method for producing a fluoride phosphor according to claim 6, further comprising a granulating procedure that includes crushing, pulverization, and classification operation.

14. The method for producing a fluoride phosphor according to claim 1, wherein the first fluoride phosphor contains an element containing at least one selected from the group consisting of alkali metals, an element $M^1$ containing at least one selected from the group consisting of group 13 elements, an element $M^2$ containing at least one selected from the group consisting of group 4 elements and group 14 elements, manganese, and fluorine, wherein the fluoride phosphor has a composition in which, when a total number of moles of the alkali metal is 2, a total number of moles of the element $M^1$, the element $M^2$, and the manganese is 0.9 or more and 1.1 or less, a number of moles of the element $M^1$ is more than 0 and 0.2 or less, a number of moles of the manganese is more than 0 and 0.2 or less, and a number of moles of the fluorine is 5.9 or more and 6.1 or less.

15. The method for producing a fluoride phosphor according to claim 1, wherein the first fluoride phosphor has a composition represented by the following Formula:

$$M^3_2[M^2_p M^1_q Mn_r F_s]$$

wherein $M^1$ contains at least one selected from the group consisting of group 13 elements, $M^2$ contains at least one selected from the group consisting of group 4 elements and group 14 elements, $M^3$ contains at least one selected from the group consisting of alkali metals, $0.9 \leq p+q+r \leq 1.1$, $0 < q \leq 0.2$, $0 < r \leq 0.2$, and $5.9 \leq s \leq 6.1$.

16. The method for producing a fluoride phosphor according to claim 1, wherein the second solution consists essentially of hexafluorosilicic acid and water.

17. The method for producing a fluoride phosphor according to claim 1, wherein the first solution comprises hydrogen fluoride, and wherein in the first solution, a content of $M^1$ is 0.01 mass % or more and 15.0 mass % or less, a content of manganese is 0.01 mass % or more and 50 mass % or less and a content of hydrogen fluoride is 20 mass % or more and 80 mass % or less.

18. The method for producing a fluoride phosphor according to claim 1, wherein the second solution contains an $M^2$ source, and wherein a content of the $M^2$ source is 1 mass % or more and 50 mass % or less in the second solution.

19. The method for producing a fluoride phosphor according to claim 1, wherein the third solution contains an alkali metal source and hydrogen fluoride, and wherein in the third solution, a content of the alkali metal source is 3 mass % or more and 70 mass % or less, and a content of hydrogen fluoride is 5 mass % or more and 80 mass % or less.

* * * * *